United States Patent
Weidemann et al.

(10) Patent No.: US 10,543,747 B2
(45) Date of Patent: Jan. 28, 2020

(54) METHOD FOR OPERATING A MULTI-AXLE POWERTRAIN FOR A MOTOR VEHICLE, AND CORRESPONDING MULTI-AXLE POWERTRAIN

(71) Applicant: AUDI AG, Ingolstadt (DE)

(72) Inventors: Dieter Weidemann, Strammham (DE); Heiko Hanickel, Kipfenberg (DE); Florian Kolb, Gößweinstein (DE); Hans Jörg Brühl, Kösching (DE)

(73) Assignee: AUDI AG, Ingolstadt (DE)

(*) Notice: Subject to any disclaimer, the term of this patent is extended or adjusted under 35 U.S.C. 154(b) by 418 days.

(21) Appl. No.: 15/523,762

(22) PCT Filed: Nov. 5, 2015

(86) PCT No.: PCT/EP2015/075782
§ 371 (c)(1),
(2) Date: May 2, 2017

(87) PCT Pub. No.: WO2016/071433
PCT Pub. Date: May 12, 2016

(65) Prior Publication Data
US 2017/0313185 A1  Nov. 2, 2017

(30) Foreign Application Priority Data
Nov. 6, 2014 (DE) .................. 10 2014 016 437

(51) Int. Cl.
*B60K 23/08* (2006.01)
*F16H 48/30* (2012.01)
(Continued)

(52) U.S. Cl.
CPC ........ *B60K 17/352* (2013.01); *B60K 23/0808* (2013.01); *B60K 17/02* (2013.01); *B60K 17/22* (2013.01); *B60K 2023/0833* (2013.01)

(58) Field of Classification Search
None
See application file for complete search history.

(56) References Cited

U.S. PATENT DOCUMENTS 5,558,596 A * 9/1996 Adachi ............. F16H 61/66259
477/46
6,834,225 B1 * 12/2004 Jiang ..................... B60K 17/35
180/197

(Continued)

FOREIGN PATENT DOCUMENTS

CN        1643269 A     7/2005
CN      101549646 A    10/2009
(Continued)

OTHER PUBLICATIONS

German Examination Report issued in corresponding DE 10 2014 016 437.3 dated Jul. 14, 2015; 10pgs.

(Continued)

*Primary Examiner* — Justin Holmes
(74) *Attorney, Agent, or Firm* — Maier & Maier, PLLC

(57) ABSTRACT

A device and method for operating a multi-axle powertrain for a motor vehicle, with a first axle being permanently in operative connection and a second axle being at least temporarily in operative connection by a drive device via a clutch coupling. It is provided that, when the second axle is decoupled from the drive device and the starting clutch is disengaged, an expected wheel force is predictively ascertained. The determination of the wheel force takes into account a torque caused by a mass moment of inertia of the drive device, and the second axle is coupled with the drive device if the expected wheel force surpasses a maximum wheel force.

9 Claims, 1 Drawing Sheet

(51) Int. Cl.
  *B60K 17/02* (2006.01)
  *B60K 17/22* (2006.01)

(56) References Cited

U.S. PATENT DOCUMENTS

| | | | |
|---|---|---|---|
| 2009/0112385 A1* | 4/2009 | Heap | B60K 6/365 |
| | | | 701/22 |
| 2014/0038763 A1 | 2/2014 | Knickerbocker et al. | |
| 2014/0067216 A1 | 3/2014 | Stares et al. | |
| 2014/0067217 A1 | 3/2014 | Stares | |
| 2015/0239345 A1* | 8/2015 | Bruhl | B60K 23/08 |
| | | | 180/233 |

FOREIGN PATENT DOCUMENTS

| | | |
|---|---|---|
| CN | 102858580 A | 1/2013 |
| CN | 103660932 A | 3/2014 |
| DE | 102012020906 A1 | 4/2014 |
| GB | 2488155 A | 8/2012 |
| GB | 2488241 A | 8/2012 |
| WO | 2014063800 A1 | 5/2014 |

OTHER PUBLICATIONS

International Search Report issued in corresponding PCT/EP2015/075782 dated Feb. 17, 2016; 4pgs.
Chinese Office Action dated Oct. 15, 2018, in connection with corresponding CN Application No. 201580060237.1 (6 pgs., English translation not available).
Translation of the International Preliminary Report on Patentability dated May 18, 2017, in connection with corresponding International Application No. PCT/EP2015/075782 (8 pgs.).

* cited by examiner

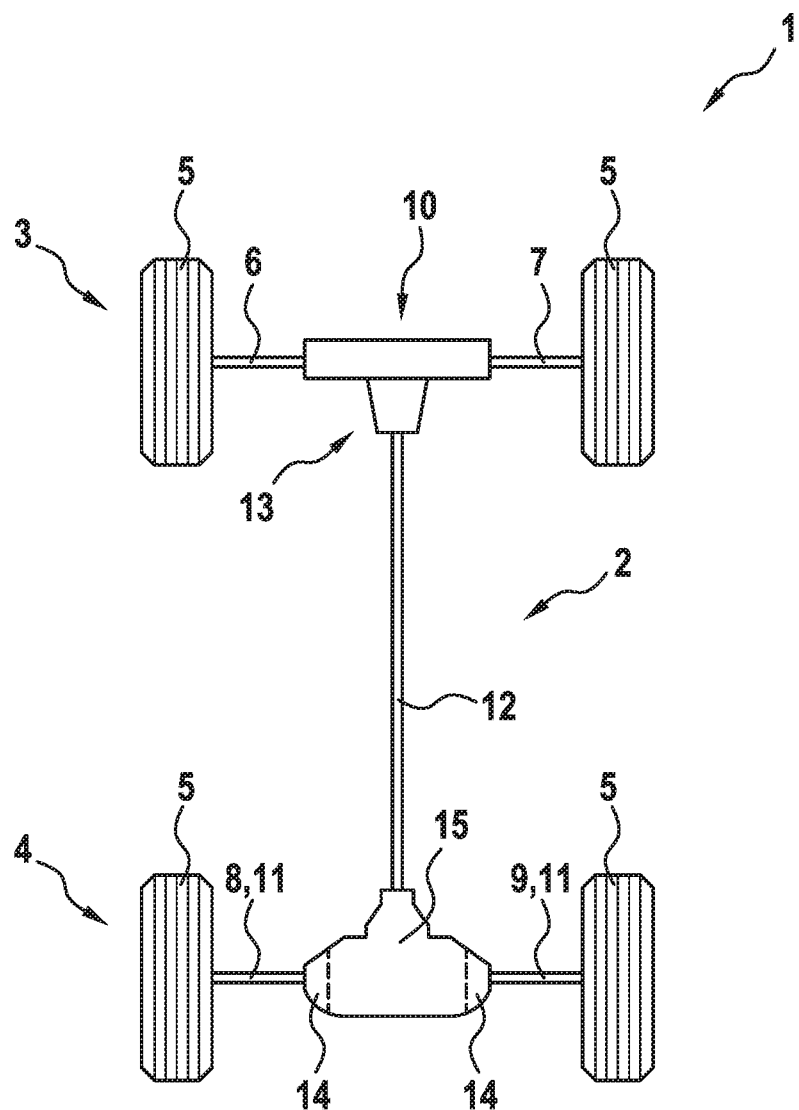

METHOD FOR OPERATING A MULTI-AXLE POWERTRAIN FOR A MOTOR VEHICLE, AND CORRESPONDING MULTI-AXLE POWERTRAIN

FIELD

The invention relates to a method for operating a multi-axle powertrain for a motor vehicle, with a first axle being permanently in operative connection and a second axle being at least temporarily in operative connection with a drive device via a clutch coupling. The invention further relates to a multi-axle powertrain.

BACKGROUND

The multi-axle powertrain can be used for example for a motor vehicle and, in particular, it can be a component of the motor vehicle. The multi-axle powertrain makes possible the driving of several axles, for example, the first axle, especially a front axle, and the second axle, especially a rear axle, of the motor vehicle. An operative connection between the axles of the motor vehicle can be produced, for example, via a connecting shaft, which is preferably present as a Cardan shaft.

It is often desirable to carry out a multi-axle operation by means of the multi-axle powertrain only temporarily, during which several of the axles, i.e., especially the first axle as well as the second axle are in fact driven. In the case of the motor vehicle, this is only necessary, for example, if the traction when driven by only one of the axles, especially the first axle, would be too little and/or if the desired driving behavior can only be achieved with multi-axle drive. Thus, it often makes sense to only drive one of the axles, namely the first axle, by means of the multi-axle powertrain.

For this reason, the first axle is permanently in an operative connection with the drive device. Accordingly, the first axle is permanently driven by the drive device. An operative connection between the drive device and the second axle, on the contrary, exists preferably only temporarily, so that the second axle is only temporarily driven by the drive device.

For this purpose, the clutch coupling is provided, which is present in the operative connection between the drive device and the second axle. With the clutch coupling disengaged, the operative connection between the drive device and the second axle is disabled, so that only the first axle is driven. When the clutch coupling is at least partly engaged, especially fully engaged, on the other hand, a portion of the torque of the drive device is transferred to the second axle.

SUMMARY

Now, the object of the invention is to propose a method for operating a multi-axle powertrain which has advantages when compared to the prior art; especially, on the one hand, it reduces a fuel consumption of the multi-axle powertrain, since, when possible, only the first axle is driven by means of the drive device, and, on the other hand, it still makes possible an excellent traction of the motor vehicle in every driving state of the motor vehicle.

It is provided that, when the second axle is decoupled from the drive device and the starting clutch is disengaged, an expected wheel force is predictively ascertained, the determination of the wheel force taking into account a torque caused by a mass moment of inertia of the drive device, and the second axle is coupled to the drive device if the expected wheel force surpasses a maximum wheel force.

Accordingly, the method comes into use when the traction is sufficient at the moment to drive only the first axle, but not the second axle, by means of the drive device.

The multi-axle powertrain preferably has a gearbox or manual transmission, by means of which one of a plurality gears is adjustable. Each gear is assigned a transmission ratio, preferably different from the other driving gears, between the drive device, on the one hand, and the first axle and the second axle on the other hand. In order to makes possible a gear change of the manual transmission, a starting clutch is provided, which is provided, for example, in an operative connection between the drive device and the manual transmission. With the aid of the starting clutch, the operative connection between the drive device and the manual transmission alternatively can be disabled or at least partly enabled, and especially fully enabled.

The starting clutch is different from the clutch coupling. While the starting clutch is present in the operative connection between the drive device, on the one hand, and both the first axle and the second axle, on the other hand, the clutch coupling serves merely to produce or operatively connect the second axle to the drive device, i.e., it is present, for example, in the operative connection between the first axle and the second axle. In the context of the preceding remarks, the starting clutch and the manual transmission are assigned, for example, to the drive device, so that according to the foregoing remarks the first axle can be permanently in operative connection with the drive device and/or be driven by it, while the second axle can be decoupled from the drive device by means of the clutch coupling.

As already explained, the driver of the motor vehicle activates the starting clutch when he would like to perform a gear change on the manual transmission. With the starting clutch disengaged, i.e., with disabled operative connection between the drive device and both the first axle and the second axle, the expected wheel force is predictively determined. The expected wheel force here corresponds to that wheel force which is presumably present during the engaging of the starting clutch and/or with the starting clutch fully engaged.

In this case, the expected wheel force particularly depends on the driver. This is due to the fact that a first driver, for example, activates the starting clutch slowly or engages it slowly on average. This results in a small expected wheel force. But a second driver may engage the clutch at least on average more quickly in certain circumstances, so that the expected wheel force is greater than in the case of the first driver. Thus, the situation may occur when it is enough for the first driver to use the torque provided by the drive device only to drive the first axle, or to transmit this torque only via the first axle to a roadway below the motor vehicle.

In the case of the second driver, this may not be enough, so that with the clutch coupling disengaged, the wheels of the first axle will spin on the roadway. For this reason, in this case, the clutch coupling should preferably be fully engaged prior to the engaging of the starting clutch, especially immediately before the engaging or at least during the engaging, and not later than at the end of the engaging, so that the torque provided by the drive unit is transmitted via both the first and also the second axle to the roadway and thus both axles are involved in the driving of the motor vehicle.

Accordingly, it is provided to couple the second axle with the drive device, especially by engaging the clutch coupling, preferably only when the expected wheel force surpasses the maximum wheel force. The maximum wheel force here can be, for example, a certain pre-determined fixed value, or however, it can be determined depending on the situation. Thus, with the help of the described method, on the one hand, a low fuel consumption can be achieved, since the second axle is not coupled to the drive device each time the starting clutch is engaged. Even so, it is ensured that an excellent traction is always present, especially for a sporty driving style, as is done by the second driver mentioned in the example above.

It is provided that the expected wheel force is determined with consideration of the torque caused by a mass moment of inertia of the drive device. The torque results from a reducing of the rotational speed of the drive device upon engaging the starting clutch, especially when the driver has shifted to a higher gear on the manual transmission and, accordingly, the rotational speed of an input shaft of the manual transmission is less than the rotational speed of the drive device. Of course, the rotational speed of the drive device can also exceed that of the input shaft if the starting clutch is disengaged at least partly, especially disengaged fully, and the drive device generates a torque which is sufficient to increase its rotational speed. The mass moment of inertia is a property of the drive device; in particular, it is constant or at least substantially constant over time. The torque preferably results from the mass moment of inertia as well as a rotational speed variable, for example, a rotational speed gradient. In particular, the torque is the product of the mass moment of inertia and the rotational speed gradient.

The torque occurring based on the mass moment of inertia of the drive device acts against a reducing of the rotational speed of the drive device during an engaging of the starting clutch. In other words, the mass moment of inertia produces the additional torque which influences the wheel force. In particular, the torque occurring due to the mass moment of inertia is added to a torque established on the drive device. The additional torque thus occurs in particular when the starting clutch is engaged once more in order to transmit the torque generated by the drive device via the manual transmission and at least the first axle, but especially the first axle as well as the second axle, to the roadway under the motor vehicle in order to accomplish an acceleration of the motor vehicle.

In one preferred embodiment of the invention, it is provided that the expected wheel force, especially the torque caused by the mass moment of inertia, is determined from a rotational speed variable of the drive device and/or a course of the rotational speed variable over time. The rotational speed variable is preferably a variable corresponding to the rotational speed of the drive device or a variable corresponding to it that is derived, in particular, from the rotational speed of the drive device.

The expected wheel force can be determined as a function of the instantaneous rotational speed variable. For example, the expected wheel force is greater for a greater rotational speed variable than for a smaller rotational speed variable. The course of the rotational speed variable over time can be used additionally or alternatively. It can be provided that the torque occurring based on the mass moment of inertia or the corresponding wheel force is learned from the rotational speed variable and/or its course over time. The expected wheel force can then be predictively determined.

For example, the rotational speed variable and/or the time function of the rotational speed variable is used to infer a driving style of the particular driver of the motor vehicle. More preferably, the driving style is categorized, for example, in the context of a periodically performed learning process, into several stages. The higher the stage, the more sporty the driving style of the driver. However, this also means that the expected wheel force is larger, the higher the assigned stage of the driver. More preferably, it can be provided to save in memory the stage determined in this way and match it up with the driver. If the same driver again drives the motor vehicle, the stage can be retrieved at once, so that the learning process can be shortened accordingly.

An enhancement of the invention calls for using a rotational speed gradient as the rotational speed variable. It has already been explained above that the rotational speed variable can be a variable derived from the rotational speed of the drive device. Preferably the rotational speed gradient will be used, corresponding to the derivative of the rotational speed over time and thus describing an acceleration or a deceleration of a drive shaft of the drive device. The drive shaft of the drive device is preferably connected via the starting clutch to an input shaft of the manual transmission. Preferably, the expected rotational speed variable or the expected rotational speed gradient upon engaging the starting clutch is learned, so that the rotational speed variable or the rotational speed gradient can be used afterwards for the predictive determination of the wheel force.

In an enhancement of the invention, it is provided that the rotational speed variable is estimated depending on the driver of the motor vehicle, a clutching behavior, and/or a driving situation. Accordingly, the rotational speed variable will be estimated on the basis of at least one parameter, preferably several parameters, and then used for determining the expected wheel force. Of course, it can be arranged that rotational speed variable or the plurality of rotational speed variables occurring during one or more clutching processes of the starting clutch will be saved or stored as a function of the driver, the clutching behavior, and/or the driving situation. Accordingly, a learning of the rotational speed variable occurs.

Another preferred embodiment of the invention calls for determining an axle torque for a first axle from the mass inertia and a powertrain transmission ratio. The powertrain transmission ratio corresponds to the ratio present between the drive device and the first axle. Accordingly, based on the mass moment of inertia and the rotational speed variable, one can infer the axle torque which is expected on the first axle as soon as the starting clutch is engaged or has been engaged. Besides the mass moment of inertia and the rotational speed variable, at least one other variable can be considered, of course, especially the torque established on the drive device or the torque generated by it.

Another embodiment of the invention calls for using the axle torque and dimensions of the wheels arranged on the first axle to infer the wheel force on one of the wheels. The axle torque applied to the first axle is transmitted via the wheels provided on the first axle to the roadway under the motor vehicle. In this process, the axle torque is preferably divided into several wheel moments, one such wheel moment being assigned to each wheel arranged on the first axle.

From the wheel moment, in turn, one can infer the wheel force acting between the respective wheel and the roadway. Thus, the wheel force constitutes the variable corresponding directly to a traction of the wheel on the roadway. The greater the wheel force, the higher the acceleration of the motor vehicle is or the greater is the share of the torque provided by the drive device that can be transmitted via the wheel or the first axle to the roadway.

In another preferred embodiment of the invention, it is provided that the maximum wheel force is determined from an axle load and a coefficient of friction present between the wheel and a roadway. It has already been explained above that the expected wheel force is compared to the maximum wheel force. The second axle is then, especially only then, coupled to the drive device when the expected wheel force surpasses the maximum wheel force.

In order to determine the maximum wheel force, i.e., the wheel force that can be transmitted at most by means of the wheel to the roadway, one determines the axle load instantaneously present on the wheel, which depends in particular on the weight of the motor vehicle. The weight can correspond to an empty weight of the motor vehicle, it can be estimated, or it can be measured. Furthermore, one determines the coefficient of friction existing between the wheel and the roadway. For this purpose, various procedures may be employed. For example, the coefficient of friction is given as a constant value, it is estimated, or it is measured. From the axle load and the coefficient of friction, the maximum wheel force that can be transmitted via the wheel results directly.

Another especially preferred embodiment of the invention calls for measuring the axle load, especially by means of at least one sensor arranged on a shock absorber of the first axle. For example, with the help of the sensor, the deflection of the shock absorber is determined, preferably the mean deflection of the shock absorber. From this deflection and a spring force of the shock absorber, one can then infer the axle load and/or the weight of the motor vehicle.

Finally, in another embodiment of the invention it can be provided to use a manually activated starting clutch as the starting clutch. Accordingly, the starting clutch can only be activated manually by the driver of the motor vehicle. It is not provided to actuate the starting clutch by a control device of the motor vehicle. Accordingly, the manual transmission of the motor vehicle is also preferably present as a manual shifting gearbox and not an automatic gearbox, for example. However, those embodiments can also be realized, of course.

The invention further relates to a multi-axle powertrain for a motor vehicle, especially for implementing the method explained above, with a first axle being permanently in operative connection and a second axle being at least temporarily in operative connection with a drive device via a clutch coupling. It is provided that the multi-axle powertrain is designed to predictively ascertain an expected wheel force when the second axle is decoupled from the drive device and the starting clutch is disengaged, wherein the determination of the wheel force takes into account a torque caused by a mass moment of inertia of the drive device, and wherein the second axle is coupled to the drive device if the expected wheel force surpasses a maximum wheel force.

The advantages of such a method and such an embodiment of the multi-axle powertrain have already been pointed out. Both the multi-axle powertrain and the method can be enhanced according to the preceding remarks, so that reference is made to them in this regard.

BRIEF DESCRIPTION OF THE DRAWINGS

The invention shall be explained more closely below based on the exemplary embodiments represented in the drawing, without this limiting the invention. The single figure shows:

FIG. 1: a schematic representation of a multi-axle powertrain for a motor vehicle.

DETAILED DESCRIPTION

The figure shows a multi-axle powertrain 1 for a motor vehicle, not otherwise represented. The multi-axle powertrain 1 has a multi-axle drive device 2, which serves for the alternative operation of only a first axle 3 or the first axle 3 as well as a second axle 4. Each of the axles 3 and 4 in the exemplary embodiment represented here has two wheels 5, which are arranged on axle members 6 and 7 of the first axle 3 and axle members 8 and 9 of the second axle 4. Now, it may be provided that the axle members 6 and 7 of the first axle 3 form a first output shaft 10. More preferably, however, they are connected via a differential gear, especially an axle differential gear, to the first output shaft 10, i.e., they are operatively connected to it, especially in rigid and/or permanent fashion. The axle members 8 and 9 can each be present as a second output shaft 11. Alternatively, it can be provided that the axle members 8 and 9 are connected via a differential gear, especially an axle differential gear, to the second output shaft 11.

The multi-axle drive device 2 has a connecting shaft 12, by which an operative connection can be produced between the first axle 3 and the second axle 4. The connecting shaft 12 is preferably designed as a Cardan shaft. A synchronizing clutch 13 is arranged in an operative connection between the first output shaft 10 and the connecting shaft 12. The synchronizing clutch 13 is preferably designed as a force-locking clutch. In particular, it allows for the transmitting of any given portion of the applied torque. Furthermore, a separating clutch 14 is also arranged in an operative connection between the connecting shaft 12 and the second output shaft 11. In the exemplary embodiment represented here, there are two separating clutches 14, each of the separating clutches 14 being arranged between a differential gear 15 and one of the two output shafts 11 or the axle members 8 and 9.

The connecting shaft 12 here is operatively connected in rigid and/or permanent manner to the differential gear 15. The operative connection between the differential gear 15 and thus the connecting shaft 12, on the one hand, and the second output shafts 11 in the form of the axle members 8 and 9, on the other hand, can be alternatively enabled or disabled with the aid of the separating clutch 14. Preferably, the separating clutches 14 are always found in the same position, so that either an operative connection between the connecting shaft 12, on the one hand, and the axle members 8 and 9, on the other hand, is enabled or disabled.

In a first operating state of the multi-axle drive device 2, the synchronizing clutch 13 and the separating clutch 14 are disengaged, so that the operative connection between the first output shaft 10 and the second output shaft 11 is disabled. Insofar as only one separating clutch 14 or one second output shaft 11 is mentioned in the following, both output shafts 11 or both separating clutches 14 are always meant in the context of the present exemplary embodiment. In a second operating state, the synchronizing clutch 13 and the separating clutch 14 are fully engaged. The separating clutch 14 is preferably designed as a form-locking clutch, especially as a dog clutch.

In the context of the multi-axle powertrain 1 presented here, the first axle 3 is in operative connection with a drive device, not represented here, or it is driven by it. The second axle, on the other hand, is only temporarily in operative connection with the drive device via a clutch coupling and accordingly is driven by it. The clutch coupling can be represented by the synchronizing clutch 13 and/or the separating clutches 14. It is only important that the operative connection between the drive device and the second drive shaft 11 can be disabled with the aid of the clutch coupling.

The multi-axle powertrain 1 is now operated such that, when the second axle is decoupled from the drive device and the starting clutch which is present between the drive device and both the first axle 3 and the second axle 4 is disengaged, an expected wheel force is predictively ascertained, the determination of the wheel force taking into account a torque caused by a mass moment of inertia of the drive device, and the second axle is coupled to the drive device if the expected wheel force surpasses a maximum wheel force. In this way, both the fuel consumption of the multi-axle powertrain 1 can be reduced, and an excellent traction can also be provided in every driving situation.

The invention claimed is:

1. A method for operating a multi-axle powertrain for a motor vehicle, comprising:
   a first axle being permanently in operative connection and a second axle being at least temporarily in operative connection with a drive device via a clutch coupling, wherein, when the second axle is decoupled from the drive device and a starting clutch is disengaged, an expected wheel force is predictively ascertained, the determination of the wheel force taking into account a torque caused by a mass moment of inertia of the drive device, and wherein the second axle is coupled with the drive device when the expected wheel force surpasses a maximum wheel force.

2. The method according to claim 1, wherein the expected wheel force is determined from a rotational speed variable of the drive device and a course of the rotational speed variable over time.

3. The method according to claim 2, wherein a rotational speed gradient is used as the rotational speed variable.

4. The method according to claim 2, wherein the rotational speed variable is determined from a driver's clutching behavior and a driving situation.

5. The method according to claim 1, wherein an axle torque for the first axle is determined from the mass inertia and a powertrain transmission ratio.

6. The method according to claim 1, wherein the wheel force on one of the wheels is determined from an axle torque and dimensions of wheels arranged on the first axle.

7. The method according to claim 1, wherein the maximum wheel force is determined from an axle load and a coefficient of friction existing between a wheel and a roadway.

8. The method according to claim 1, wherein the axle load is measured by at least one sensor arranged on a shock absorber of the first axle.

9. The method according to claim 1, wherein a manually activated starting clutch is used as the starting clutch.

* * * * *